United States Patent
Chew et al.

(10) Patent No.: US 9,380,197 B2
(45) Date of Patent: Jun. 28, 2016

(54) TECHNIQUES FOR VIDEO ANALYTICS OF CAPTURED VIDEO CONTENT

(75) Inventors: Yen Hsiang Chew, Penang (ML); Boon Hee Kam, Penang (ML); Esther Chee Hsiang Cheng, Bayan Lepas (ML); Ivan Yu Kit Ho, Bayan Lepas (ML)

(73) Assignee: INTEL CORPORATION, Santa Clara, CA (US)

( * ) Notice: Subject to any disclaimer, the term of this patent is extended or adjusted under 35 U.S.C. 154(b) by 768 days.

(21) Appl. No.: 13/548,587

(22) Filed: Jul. 13, 2012

(65) Prior Publication Data
US 2014/0015964 A1    Jan. 16, 2014

(51) Int. Cl.
| | |
|---|---|
| H04N 5/225 | (2006.01) |
| H04N 5/232 | (2006.01) |
| G08B 13/196 | (2006.01) |
| H04N 7/18 | (2006.01) |
| H04N 21/2187 | (2011.01) |
| H04N 21/266 | (2011.01) |
| H04N 5/247 | (2006.01) |

(52) U.S. Cl.
CPC .......... *H04N 5/232* (2013.01); *G08B 13/19608* (2013.01); *G08B 13/19645* (2013.01); *G08B 13/19671* (2013.01); *H04N 5/23206* (2013.01); *H04N 7/181* (2013.01); *H04N 21/2187* (2013.01); *H04N 21/26603* (2013.01); *G08B 13/19663* (2013.01); *H04N 5/23229* (2013.01); *H04N 5/247* (2013.01)

(58) Field of Classification Search
CPC .............. H04N 5/232; H04N 5/23203; H04N 5/23206; H04N 1/00204; H04N 2201/0084; H04N 21/26603; H04N 7/181; H04N 21/2187; H04N 5/247; H04N 5/23229; G08B 13/19671; G08B 13/19645; G08B 13/19608; G08B 13/19663

USPC .................................. 348/207.11, 207.1, 552
IPC .......... H04N 5/232,5/23203, 5/23206, 1/00204, H04N 2201/0084
See application file for complete search history.

(56) References Cited

U.S. PATENT DOCUMENTS

| | | | | |
|---|---|---|---|---|
| 6,980,233 | B1 * | 12/2005 | Hirasawa | .......... H04L 12/40117 348/207.1 |
| 2011/0234820 | A1 * | 9/2011 | Lee et al. | .................. 348/207.11 |
| 2011/0317022 | A1 * | 12/2011 | Cao | ........................... 348/207.11 |

FOREIGN PATENT DOCUMENTS

| | | |
|---|---|---|
| KR | 10-2006-0093951 | 8/2006 |
| KR | 10-2009-0069001 | 6/2009 |

OTHER PUBLICATIONS

Office Action received for Korean Patent Application No. 10-2013-83179, mailed Aug. 5, 2014, 16 pages including 8 pages English translation.

* cited by examiner

*Primary Examiner* — Yogesh Aggarwal

(57) ABSTRACT

Examples are disclosed for video analytics of captured video content. In some examples, information may be received from a host processing system for a camera to capture video content. The camera may be a surveillance camera or a camera located with a display device. Video analytics may be performed on the captured video and the captured video content may be encoded. Data associated with the video analytics may then be sent to the host processing system. In some examples, the data as well as encoded captured video content or streaming video may be sent via communication channels included in an interconnect. Other examples are described and claimed.

23 Claims, 9 Drawing Sheets

TECHNIQUES FOR VIDEO ANALYTICS OF CAPTURED VIDEO CONTENT

BACKGROUND

Video content captured by a camera coupled to a computing device or host processing system includes sending either encoded captured video or raw (not encoded) captured video to the host processing system. The host processing system may perform video analytics and/or store the captured video content. Video analytics may include object tracking, pattern matching or feature extractions and various other types of analysis to pull information from the captured video. If raw captured video was received, the host processing system may also encode the raw captured video for storage purposes. The raw captured video may be encoded using various encoding schemes (e.g., H.264; H.265).

Interconnects commonly used for coupling a host processing system to one or more cameras may include interconnects associated with wired or wireless network interfaces (e.g., Ethernet) or associated with serial buses (e.g., Universal Serial Bus (USB)). These types of interconnects typically require that captured video be sent as either an encoded video data stream or as a raw video data stream. Cameras are increasingly being deployed that capture high definition video. This high definition video may result in a large amount of data passing between a high definition camera and a host processing system if raw captured video is sent. Also, if the captured video is encoded, the host processing system has to first decode the encoded captured video in order to perform video analytics. Further, some original video data may be lost during the encoding process by the camera and this may negatively impact the accuracy of the video analytics performed. It is with respect to these and other challenges that the embodiments described herein are needed.

DETAILED DESCRIPTION

As contemplated in the present disclosure, one or more cameras coupled to a processing system may send captured video content as either a raw video data stream or an encoded video data stream when interconnects such as those associated with Ethernet interfaces or USB are used. A raw video data stream may require very large amounts of data over these interconnects. Also, if the captured video content is encoded to reduce the data load, some captured video content may be lost and video analytics performed by the host processing system may be less accurate. Further, conventional display buses or interconnects (e.g., High-Definition Multimedia Interface (HDMI), Digital Visual Interface (DVI), DisplayPort, etc.) may not be configured to convey video analytics from the one or more cameras to the host processing system. Hence, the host processing system needs to perform video analytics data of captured video content.

A host processing system that may need to both decode encoded captured video content and perform video analytics may be incrementally burdened for each camera that couples to the host processing system. Additionally, as cameras are being designed to capture higher resolutions, the host processing system may be limited in the number of high resolution or high definition cameras the host processing system can support.

In some examples, techniques are implemented for video analytics of captured video content at the point of capture, e.g., at the camera. For these examples, information may be received at a camera from a host processing system. Video content may be captured by the camera based, at least in part, on the received information. Video analytics may then be performed on the captured video content. Data associated with the video analytics may then be sent to the host processing system.

According to some examples, techniques are implemented for receiving data associated with video analytics, e.g., at a host processing system. For these examples, information may be sent from the host processing system to a camera. The information may direct the camera to capture video content. Data associated with video analytics for video content captured by the camera may be sent by the camera responsive to the information sent to the camera. Updated information may then be sent from the host processing system to the camera based on the data associated with the video analytics.

Figure 1:
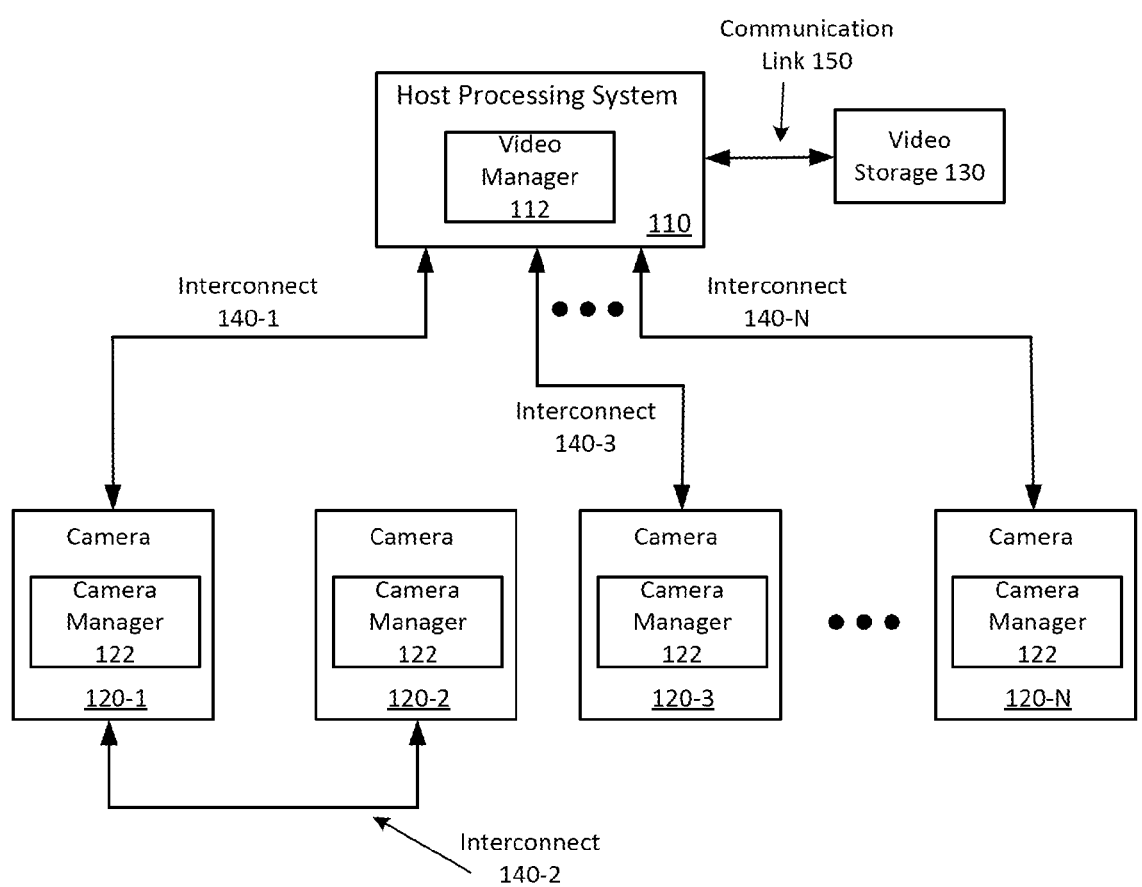
FIG. 1 illustrates an example first system.

FIG. 1 illustrates an example first system. In some examples, as shown in FIG. 1, the example first system includes system 100. As shown in FIG. 1, system 100 includes a host processing system 110, cameras 120-1 to 120-N ("N" is any positive integer >1) and video storage 130. Also, as shown in FIG. 1, cameras 120-1 to 120-N may be coupled either directly or indirectly to host processing system 110 via interconnects 140-1 to 140-N. For example, camera 120-1, 120-3 and 120-N are shown in FIG. 1 as directly coupling via interconnects 140-1, 140-3 and 140-N, respectively. Camera 120-2, in some examples, may indirectly couple to host processing system 110 by first coupling to camera 120-1 via interconnect 140-2 and then using interconnect 140-1 to couple to host processing system 110 (e.g., daisy-chaining). Communication link 150 is also shown in FIG. 1 as coupling video storage 130 to host processing system 110.

In some examples, as shown in FIG. 1, host processing system 110 includes a video manager 112 and each camera 120-1 to 120-N includes a camera manager 122. As described more below, video manager 112 may include logic and/or features configured or arranged to provide information to cameras for performing video analytics on captured video content, receiving data associated with the performed video analytics or sending updated information based on the received data. Also, as described more below, camera manager 122 may include logic and/or features configured or arranged to receive information, capture video content based on the received information, perform video analytics on the captured video content, encode captured video content or send data associated with the video analytics and/or the encoded captured video content to a host processing system such as host processing system 110 having video manager 112.

According to some examples, host processing system 110 and cameras 120-1 to 120-N may include logic and/or features (e.g., device drivers—not shown) to concurrently handle two data streams or two communication channels routed through each of interconnects 140-1 to 140-N. For these examples, as described more below, a first communication channel may be used to transmit information (e.g., camera commands/directions) or data associated with video analytics. A second communication channel may be used to transmit raw video or encoded video. In some examples, the two communication channels may be multiplexed and routed in a single interconnect such as interconnect 140-1 that couples camera 120-1 to host processing system 110. In other examples, the two communication channels may be multiplexed and routed through a multitude of interconnects such as interconnects 140-1 and 140-2 that allow for camera 120-2 to indirectly couple to host processing system 110 through an intermediate camera such as camera 120-1.

In some examples, the first communication channel used to transmit or send information or data associated with video analytics may send the data in accordance with an industry standard (including progenies and variants) to include, but not limited to, the Peripheral Component Interconnect Express (PCI Express) Base 3.0 specification, published in November of 2010 (hereinafter "PCI Express"). For these examples, the second communication channel used to send encoded video may send the encoded video in accordance with an industry standard (including progenies and variants) to include, but not limited to, the Video Electronics Standards Association (VESA) DisplayPort Standard, version 1.2, published in January of 2010 (hereinafter "DisplayPort"). Also, for these examples, the two communication channels may be arranged or configured to operate within interconnects 140-1 to 140-N according to a technology by Intel® called Thunderbolt™.

In some examples, video storage 130 may be a type of mass storage device (e.g., hard disk or solid disk drives) to at least store video content received by host processing system 110 from cameras 120-1 to 120-N. As described more below, in some examples, cameras similar to cameras 120-1 to 120-N may be located with or mounted at display devices. These display devices may display video content streamed from a host processing system such as host processing system 110. For these examples, at least some of the streamed video content may be maintained in video storage 130. For either example, communication link 150 may operate in accordance with one or more industry standards (including progenies and variants such as those associated with PCI-Express, USB or Serial Advanced Technology Attachment (SATA).

Figure 2:
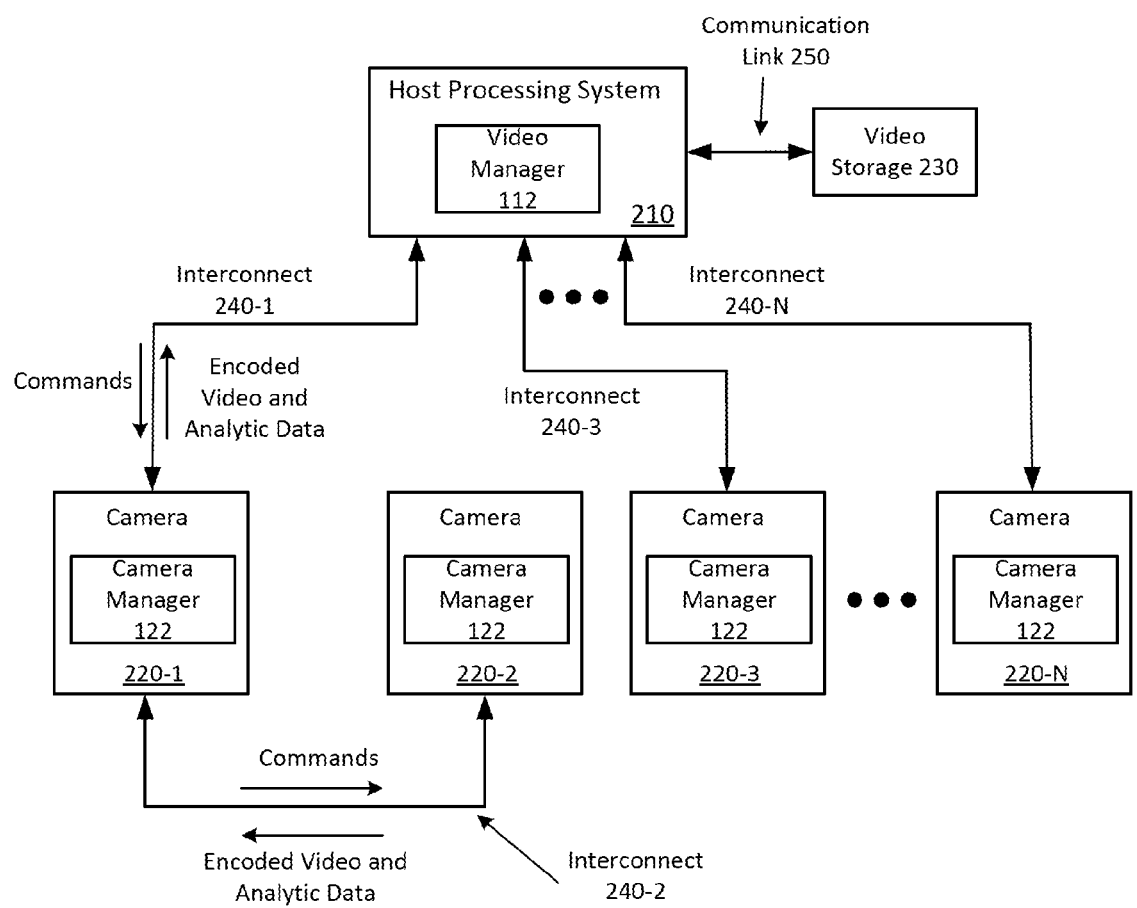
FIG. 2 illustrates an example second system.

FIG. 2 illustrates an example second system. In some examples, as shown in FIG. 2, the second system includes surveillance system 200. As shown in FIG. 2, surveillance system 200 includes similar elements to the elements shown in FIG. 1. For example, surveillance system 200 includes a host processing system 210, cameras 220-1 to 220-N and video storage 230. FIG. 2 also shows cameras 220-1 to 220-N coupling either directly or indirectly to host processing system 210 via interconnects 240-1 to 240-N. Also, video storage 230 may couple to host processing system 210 via communication link 250 as shown in FIG. 2.

According to some examples, cameras 220-1 to 220-N may be deployed as surveillance cameras. For these examples, elements of cameras 220-1 to 220-N (e.g., camera manager 122) may be arranged or configured to receive information from elements of host processing system 210 (e.g., video manager 112), capture video content based on the received information, perform video analytics on the captured video content and then send data associated with the video analytics to host processing system 210.

In some examples, the information received from host processing system 110 at cameras 220-1 to 220-N may include one or more camera commands to capture the video content. These one or more commands may include, but are not limited to, a camera direction, a time period for a camera direction, panning between first and second camera directions, a camera zoom or a camera tilt. For example, as shown in FIG. 2, commands may be received by camera 220-1 via interconnect 240-1 and by camera 220-2 via both interconnect 240-1 and interconnect 240-2.

In some examples, the information received from host processing system 110 at cameras 220-1 to 220-N may include one or more camera commands to select one or more video analytics to perform on a captured video, and to send data associated with the video analytics to host processing system 110.

In some examples, the information may include additional commands from host processing system 110. The additional commands may include a request for cameras 220-1 to 220-N to perform different types of video analytics and extract desired data as needed (e.g., by a user). These additional commands can also be used to change types of video analytics performed by cameras 220-1 to 220-N. For example, these cameras may include logic and/or features to perform background subtraction to determine whether a person or object is present in a camera view. When a person or object is detected, host processing system 110 may include logic and/or features arranged to issue a command to cameras 220-1 to 220-N to perform facial recognition and object tracking to identify and track the person.

According to some examples, logic and/or features at cameras 220-1 to 220-N may also be configured to encode captured video content (e.g., surveillance video). For these examples, both the data associated with the video analytics and the encoded video content may be sent via interconnects 240-1 to 240-N to host processing system 210. For example, as shown in FIG. 2, encoded video and analytic data may be sent from camera 220-1 via interconnect 240-1 and from camera 220-2 via both interconnect 240-2 and 240-1. Also for these examples, the analytic data may be sent via a first communication channel (e.g., a PCI-Express communication channel) and the encoded video may be sent via a second communication channel (e.g., a DisplayPort communication channel). Both the first and the second communication channels may be included in either a single interconnect (e.g., interconnect 240-1) or daisy-chained in two or more interconnects (e.g., interconnects 240-1 and 240-2).

In some examples, the logic and/or features included at cameras 220-1 to 240-N may capture the video content and then perform at least some video analytics on the captured video content before encoding the captured video content. Surveillance-related data associated with these video analytics may include, but is not limited to, a movement pattern of one or more objects in the captured video content, a lighting condition in the captured video content, the presence or absence of one or more objects in the capture video, locations of one or more objects in the captured video (for example: object tracking), identity of one or more persons or objects in the captured video (for example: facial recognition or object recognition), color characteristics of one or more objects in the captured video or shape characteristics of one or more objects in the captured video. Host processing system 210 may receive this surveillance-related data and then send updated camera commands, based on the surveillance-related data. For example, analytic data including movement patterns may indicate more movement at an edge of a camera's field of view. The updated camera command may direct the camera to adjust the camera's direction to center the camera's field of view where movement patterns indicated more movement.

Figure 3:
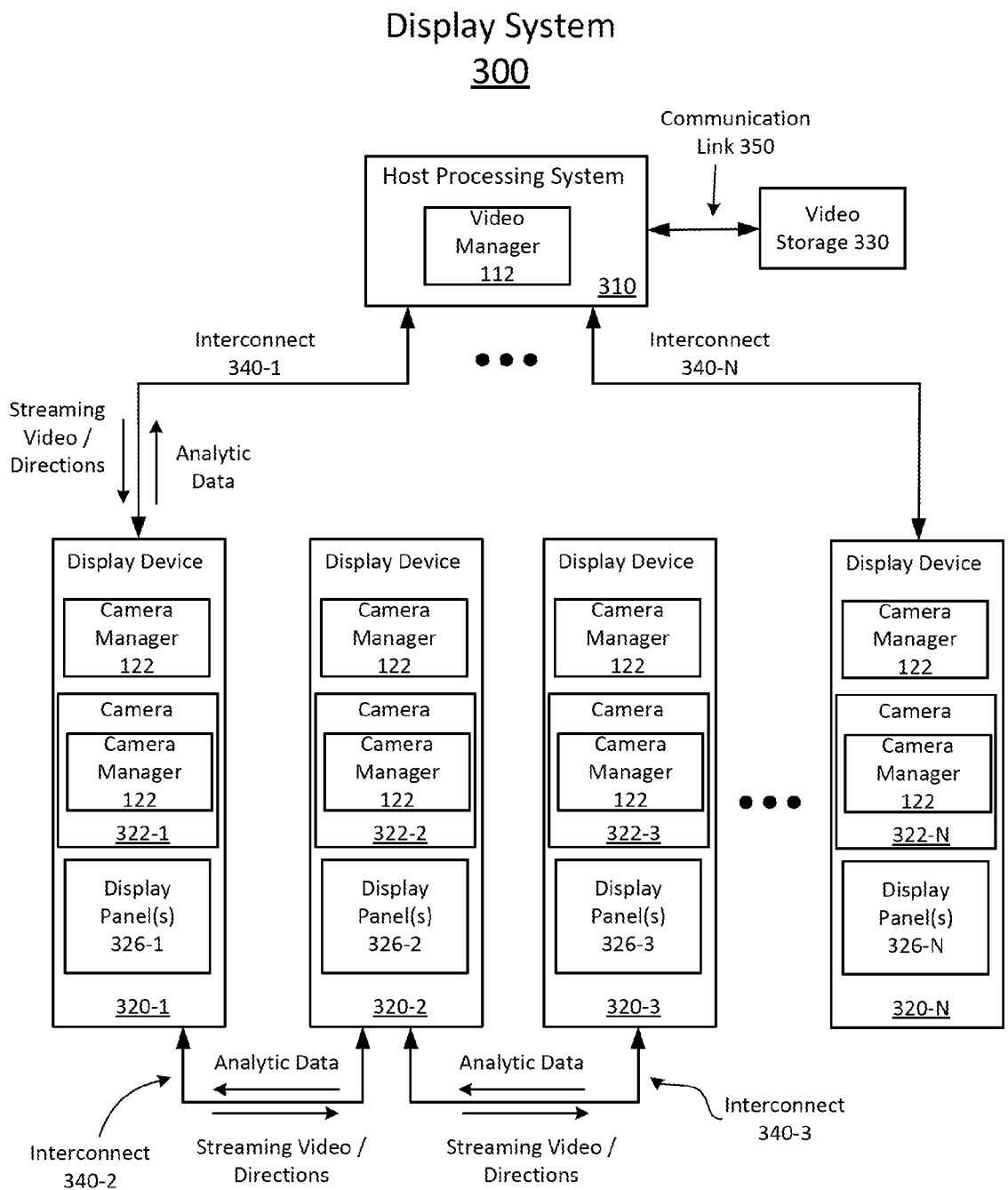
FIG. 3 illustrates an example third system.

FIG. 3 illustrates an example third system. In some examples, as shown in FIG. 3, the third system includes display system 300. As shown in FIG. 3, display system 300 includes similar elements to the elements shown in FIGS. 1 and 2. For example, display system 300 includes a host processing system 310, cameras 322-1 to 322-N and video storage 330. However, different from FIGS. 1 and 2, display system 300 includes display devices 320-1 to 320-N each having display panel(s) 326-1 to 326-N. Display devices 320-1 to 320-N may couple to host processing system 310 either directly or indirectly via interconnects 340-1 to 340-N. Also, video stored 330 may couple to host processing system 310 via communication link 350.

According to some examples, cameras 322-1 to 322-N may be located with or mounted near respective display panel(s) 326-1 to 326-N. For these examples, each camera may be oriented to capture video content contemporaneously with its display panel(s) displaying video. For example, camera 322-1 may be mounted at or near display panel(s) 326-1 such that captured video content includes video of objects, observers, lighting conditions, etc. that may be in front or within an observable range of video displayed by display panel(s) 326-1.

In some examples, display panel(s) 326-1 to 326-N may include monitors, screens, displays, paneled displays or any type of medium to display video images. The displayed video images may include, but are not limited to, images for advertisements, general information (e.g., maps, directions, warnings, weather forecasts, etc.), news reports, entertainment or interactive gaming. According to some examples, display devices 320-1 to 320-N may receive streaming video from host processing system 310 via interconnects 340-1 to 340-N. The streaming video, for example, may include video to be displayed on display panel(s) 326-1 to 326-N.

According to some examples, as shown in FIG. 3, host processing system 310 may send streaming video and directions to display device 320 via interconnect 340-1. Also, in some examples, the same streaming video and same directions may also be sent to display devices 320-2 and 320-3 via daisy-chained interconnects 340-2 and 340-3, respectively. In alternative examples, different streaming video and different directions may sent individually to display devices 320-2 and 320-3 via daisy-chained interconnects 340-2 and 340-3, respectively. For either of these examples, the directions may direct cameras 322-1 to 322-3 to capture video content contemporaneously with their respective display panels displaying the video streamed from host processing system 310.

According to some examples, as shown in FIG. 3, a camera manager 122 may be located with or part of a camera. For these examples, the camera may perform analytics on video content captured while display panel(s) of the display device display video streamed from host processing system 310. Also, as shown in FIG. 3, in other examples, a camera manager 122 may be included in a display device separate from a camera. For these other examples, the camera may capture the video content and then forward the captured video content to logic and/or features at the display device for performance of analytics on the video content captured by the camera.

In some examples, video analytics performed on video content captured may result in data associated with these video analytics. For example, the data may include a movement pattern for observers of displayed video. The data may also include shape characteristics (e.g., height, weight, hair styles, etc.) for observers of displayed video. The data may also include lighting conditions at the display panel(s) via which the video was displayed. The data may also include types of interactions (e.g., hand/arm gestures, head movements, leg movements, etc.) for observers when observing the displayed video. The examples are not limited in this context.

According to some examples, data associated with video analytics performed either by a display device or a camera may be sent via a first communication channel (e.g., a PCI-Express communication channel) and the streaming video may be received via a second communication channel (e.g., a DisplayPort communication channel). Both the first and the second communication channels may be included in either a single interconnect or daisy-chained in two or more interconnects. For example, as shown in FIG. 3, interconnects 340-3 and 340-2 may be daisy-chained to allow display device 320-3 to receive streaming video/directions and to send analytic data to host processing system 310.

In some examples, host processing system 310 may receive data associated with video analytics performed by either cameras 322-1 to 322-N and/or by display devices 320-1 to 320N. For these examples, host processing system 310 may include logic and/or features to send updated information and/or updated streaming video. For example, the data associated with video analytics may indicate that movement patterns for observers of the displayed video are indicating quick movement past display panel(s) 326-1 to 326-N (e.g., observers in vehicles traveling at freeway speeds). The updated streaming video may be arranged such that the displayed video can be better observed given these movement patterns (e.g., short, concise images). Also, the updated information may direct cameras 322-1 to 322-N to capture additional video content contemporaneously with display panel(s) 326-1 to 326-N displaying the updated video stream. Data associated with additional video analytics may then be provided to host processing system 310 based on this additionally captured video content. In some examples, the updated information may also include adjustments to camera position, panning, zoom or camera tilt when capturing the additional video content.

In some examples; host processing system 310 may store video analytics data received from cameras 322-1 to 322-N in video storage 330 or send the data to a remote system through a network link (not shown). Additional processing, statistical analysis or data mining may be performed on video analytics data received from cameras 322-1 to 322-N by host processing system 310. Host processing system 310 may store the processed data in video storage 330 or send the data to a remote system through a network link (not shown).

According to some examples, camera manager 122 located at either cameras 322-1 to 322-N or at display devices 320-1 to 320-N may also encode captured video content. Similar to surveillance system 200, camera managers 122 for display system 300 may send data associated with video analytics via a first communication channel (e.g., a PCI-Express communication channel) to host processing system 310 and may send the encoded captured video content via a second communication channel (e.g., a DisplayPort communication channel) to host processing system 310. Both the first and the second communication channels may be included in either a single interconnect (e.g., interconnect 340-1) or daisy-chained in two or more interconnects (e.g., interconnects 340-1, 340-2 and 340-3). Host processing system 310 may perform additional video analytics on the encoded captured video content and/or may store the captured video content at video storage 330.

Figure 4:
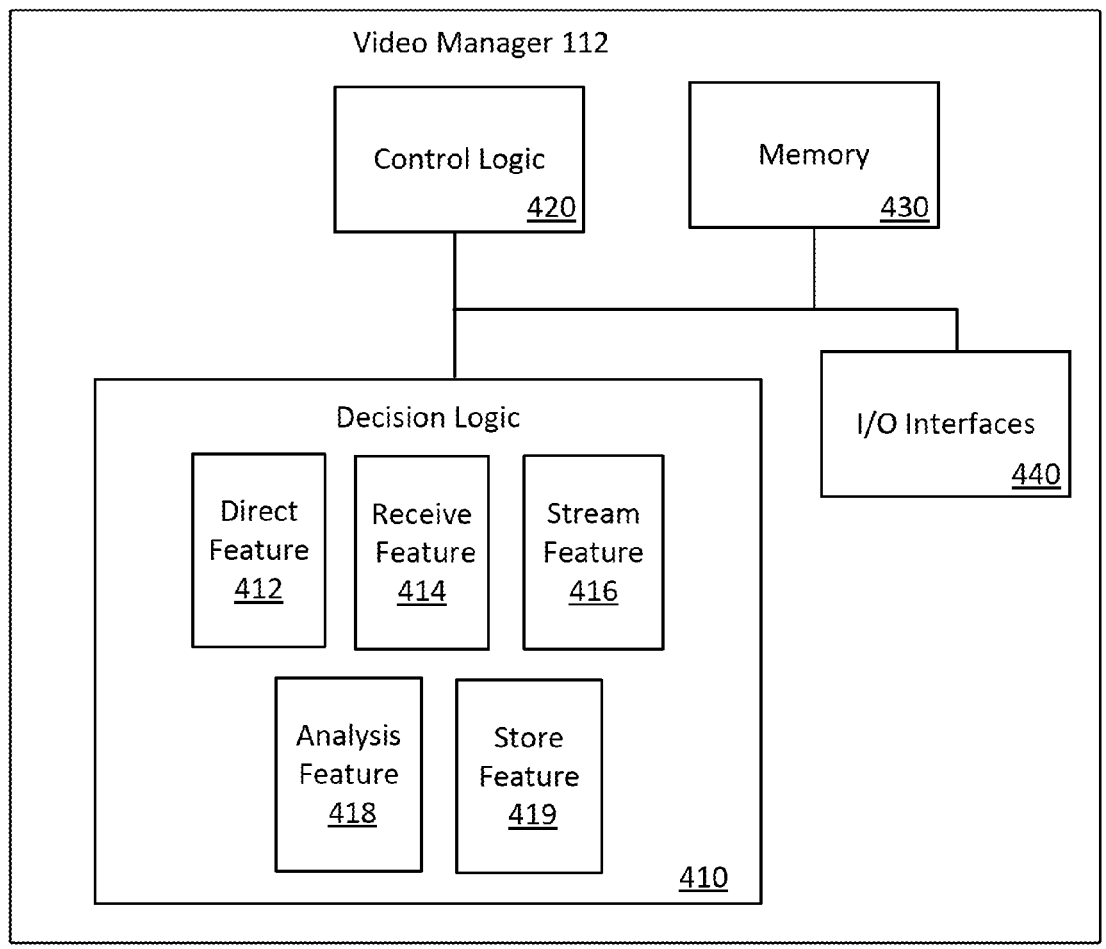
FIG. 4 illustrates a block diagram of an example architecture for a video manager.

FIG. 4 illustrates a block diagram of an example architecture for a video manager 112. In some examples, video manager 112 includes features and/or logic configured or arranged for sending information and/or streaming video to camera managers 122 at cameras or display devices. The information may direct one or more cameras to capture video content, receive data associated with video analytics for the captured video content and then send updated information based on the data associated with the video analytics. According to some examples, as shown in FIG. 4, video manager 112 includes a decision logic 410, a control logic 420, a memory 430 and input/output (I/O) interfaces 440. As illustrated in FIG. 4, decision logic 410 may be coupled to control logic 420, memory 430 and I/O interfaces 440. Decision logic 410 may include one or more of a direct feature 412, a receive feature 414, a stream feature 416, an analysis feature 418 or a store feature 419, or any reasonable combination thereof.

In some examples, the elements portrayed in FIG. 4 are configured to support or enable video manager 112 as described in this disclosure. A given video manager 112 may include some, all or more elements than those depicted in FIG. 4. For example, decision logic 410 and control logic 420 may separately or collectively represent a wide variety of logic device(s) or executable content to implement the features of video manager 112. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor, or a combination thereof.

In some examples, as shown in FIG. 4, decision logic 410 includes direct feature 412, receive feature 414, stream feature 416, analysis feature 418 or store feature 419. Decision logic 410 may be configured to use one or more of these features to perform operations. For example, direct feature 412 may send information to direct a camera to capture video content. Receive feature 414 may receive data associated with video analytics for the video content captured by the camera. Stream feature 416 may stream video for display by one or more display panels at a display device. Analysis feature 418 may analyze the received data associated with the video analytics and determine updated information for direct feature 412 to send to the camera to capture addition video content. Store feature 419 may store received encoded video, data associated with video analytics received from a camera or other data obtained as a result of processing video analytics data in a local storage or a remote storage.

According to some examples, analysis feature 418 may analyze the received data associated with the video analytics and invoke host processing system 110 to perform additional processing in response to the video analytics data received from cameras. Processing that the host processing system 110 performs may include, but is not limited to, viewer gesture interpretation, executing additional commands in response to a detected human gesture, communication with a remote system or raising an alarm in response to a detected threat condition. Analysis feature 418 may also perform additional statistical analysis or data mining on video analytics data received from cameras.

In some examples, control logic 420 may be configured to control the overall operation of video manager 112. As mentioned above, control logic 420 may represent any of a wide variety of logic device(s) or executable content. For some examples, control logic 420 may be configured to operate in conjunction with executable content or instructions to implement the control of video manager 112. In some alternate examples, the features and functionality of control logic 420 may be implemented within decision logic 410.

According to some examples, memory 430 may be arranged to store executable content or instructions for use by control logic 420 and/or decision logic 410. The executable content or instructions may be used to implement or activate features, elements or logic of video manager 112. As described more below, memory 430 may also be arranged to at least temporarily maintain received data associated with video analytics. Memory 430 may also be arranged to at least temporarily maintain information used to direct cameras to capture video content.

Memory 430 may include a wide variety of non-volatile memory media including, but not limited to, one or more types of flash memory, programmable variables or states, read-only memory (ROM), random access memory (RAM), or other static or dynamic storage media.

In some examples, I/O interfaces 440 may provide an interface via a local communication medium or link between video manager 112 and elements of a host processing system. I/O interfaces 440 may include interfaces that operate according to various communication protocols to communicate over the local communication medium or link. These communication protocols may be described in one or more industry standards/specifications (including progenies and variants) such as those associated with the Open NAND Flash Interface Specification (ONFi), the Inter-Integrated Circuit ($I^2C$) specification, the System Management Bus (SMBus) specification, the Accelerated Graphics Port (AGP) specification, the PCI Express specification, the USB specification or the SATA specification. This disclosure is not limited to only the above-mentioned standards/specifications and their associated protocols.

According to some examples, I/O interfaces 440 may provide an interface via communication mediums, links or interconnects between video manager 112 and elements outside of a host processing system (e.g., camera managers 122s). I/O interfaces 440 may include interfaces that operate according to various communication protocols described in standards/ specifications or industry technologies in order to communicate over these communication mediums, interconnects or links. These communication protocols may be described in standards/specifications or industry technologies (including progenies and variants) such as the Ethernet standard, the SATA specification, the PCI Express specification, the USB specification, the DisplayPort standard or the Thunderbolt™ technology by Intel®. This disclosure is not limited to only the above-mentioned standards/specifications or technologies and their associated communication protocols.

Figure 5:
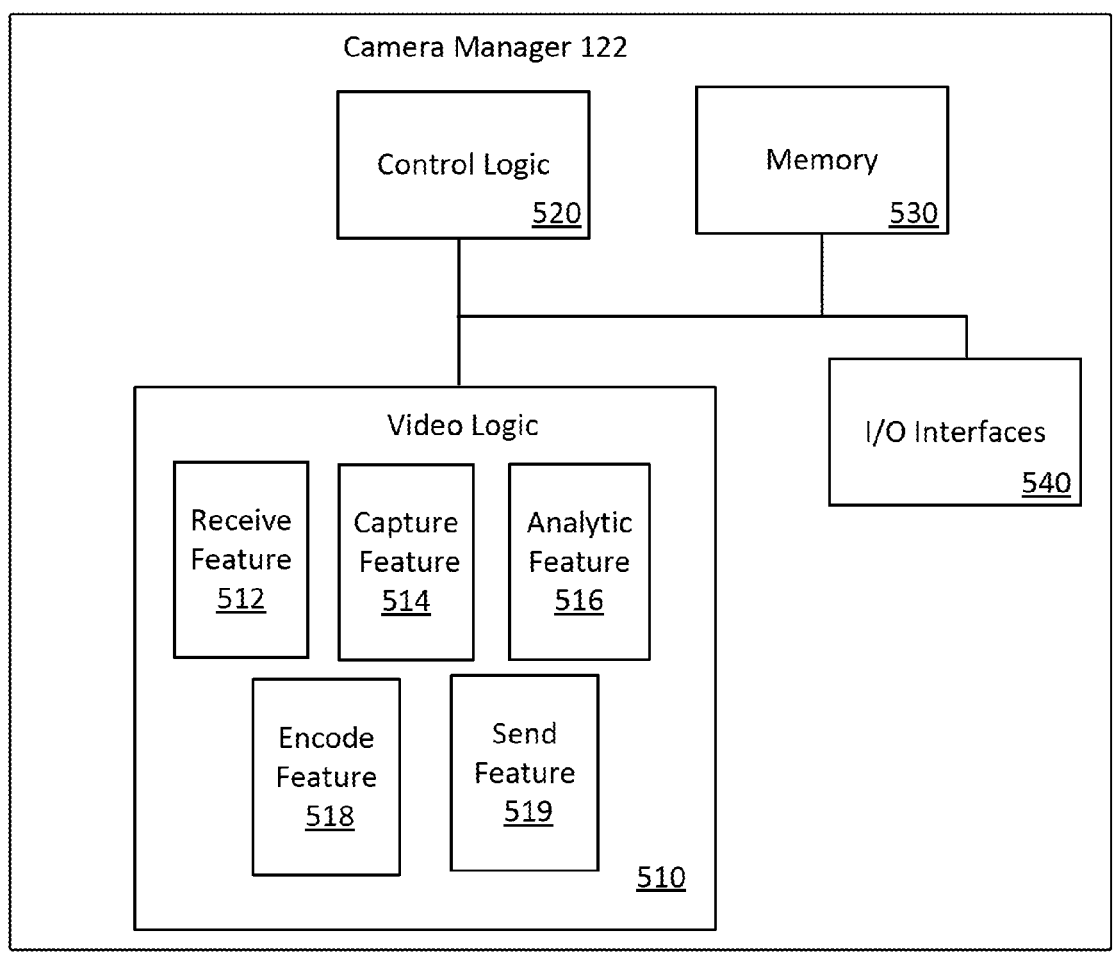
FIG. 5 illustrates a block diagram of an example architecture for a camera manager.

FIG. 5 illustrates a block diagram of an example architecture for camera manager 122. In some examples, camera manager 122 includes features and/or logic configured or arranged for receiving information from a host processing system (e.g., via a video manager 112). A given camera manager 122 at either a camera or display device may also include logic and/or features to capture video content using a camera based on the received information, perform video analytics on the captured video content, encode the captured video content and send data associated with the video analytics and/or send the encoded captured video content to the host processing system (e.g., to a video manager 112). According to some examples, as shown in FIG. 5, camera manager 122 includes a video logic 510, a control logic 520, a memory 530 and input/output (I/O) interfaces 540. As illustrated in FIG. 5, video logic 510 may be coupled to control logic 520, memory 530 and I/O interfaces 540. Video logic 510 may include one or more of a direct feature 512, a capture feature 514, an analytic feature 516, an encode feature 518, or a send feature 519 or any reasonable combination thereof.

In some examples, the elements portrayed in FIG. 5 are configured to support or enable camera manager 122 as described in this disclosure. A given camera manager 122 may include some, all or more elements than those depicted in FIG. 5. For example, video logic 510 and control logic 520 may separately or collectively represent a wide variety of logic device(s) or executable content to implement the features of camera manager 122. Example logic devices may include one or more of a microprocessor, a microcontroller, a processor circuit, an FPGA, ASIC, a sequestered thread or a core of a multi-core/multi-threaded microprocessor, or any combination thereof.

In some examples, as shown in FIG. 5, video logic 510 includes direct feature 512, capture feature 514, analytic feature 516, encode feature 518 or send feature 519. Video logic 510 may be configured to use one or more of these features to perform operations while camera manager 122 is located with a camera or a display device. For example, receive feature 512 may receive information sent by video manager 112 at a host processing system. Capture feature 514 may capture video content based on the received information. Analytic feature 516 may perform video analytics on the captured video content. Encode feature 518 may encode the captured video content. Send feature 519 may send data associated with the video analytics and may also send the encoded captured video content to video manager 112 at the host processing system.

In some examples, control logic 520 may be configured to control the overall operation of camera manager 122. As mentioned above, control logic 520 may represent any of a wide variety of logic device(s) or executable content. For some examples, control logic 520 may be configured to operate in conjunction with executable content or instructions to implement the control of camera manager 122. In some alternate examples, the features and functionality of control logic 520 may be implemented within video logic 510.

According to some examples, memory 530 may be arranged to store executable content or instructions for use by control logic 520 and/or video logic 510. The executable content or instructions may be used to implement or activate features, elements or logic of camera manager 122. Memory 530 may also be arranged to at least temporarily maintain data associated with video analytics for captured video content. Memory 530 may also be arranged to at least temporarily maintain encoded captured video content before sending the encoded captured video content.

Memory 530 may include a wide variety of non-volatile memory media including, but not limited to, one or more types of flash memory, programmable variables or states, ROM, RAM, or other static or dynamic storage media.

In some examples, I/O interfaces 540 may provide an interface via a local communication medium or link between camera manager 122 and elements of either a camera or a display device. I/O interfaces 540 may include interfaces that operate according to various communication protocols to communicate over the local communication medium or link. These communication protocols may be described in one or more industry standards/specifications (including progenies and variants) such as those associated with the ONFi specification, the I²C specification, the SMBus specification, the AGP specification, the PCI Express specification, the USB specification or the SATA specification. This disclosure is not limited to only the above-mentioned standards/specifications and associated protocols.

According to some examples, I/O interfaces 540 may provide an interface via communication mediums, links or interconnects between camera manager 122 and elements of a host processing system (e.g., video manager 112). I/O interfaces 540 may include interfaces that operate according to various communication protocols described in standards/specifications or industry technologies in order to communicate over these communication mediums, interconnects or links. These communication protocols may be described in standards/specifications or industry technologies (including progenies and variants) such as the Ethernet standard, the SATA specification, the PCI Express specification, the USB specification, the DisplayPort standard or the Thunderbolt™ technology by Intel®. This disclosure is not limited to only the above-mentioned standards/specifications or technologies and their associated communication protocols.

Figure 6:
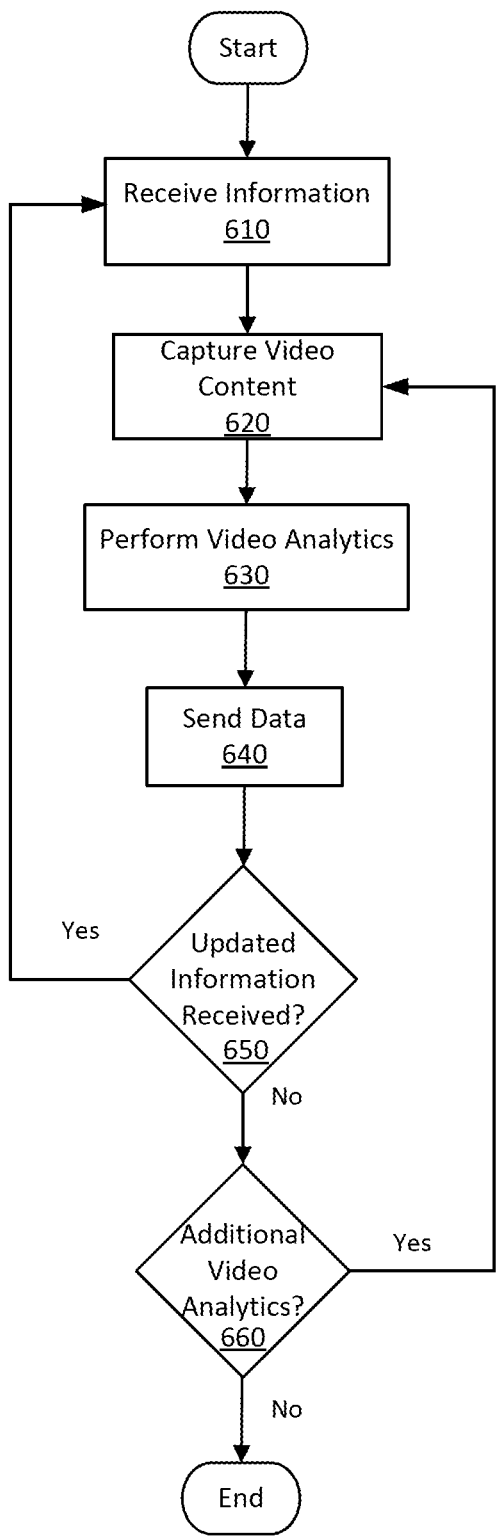
FIG. 6 illustrates an example flow diagram for video analytics of captured video content.

FIG. 6 illustrates an example flow diagram for video analytics of captured video content. In some examples, elements of systems 100, 200 or 300 as shown in FIGS. 1-3 may be used to illustrate example operations related to the flow chart depicted in FIG. 6. Camera manager 122 as shown in FIGS. 1-3 or FIG. 5 may also be used to illustrate the example operations. The described example operations are not limited to implementations on systems 100, 200 or 300 or to camera manager 122 as described above for FIGS. 1-3 or FIG. 5.

Moving from the start to block 610 (Receive Information), camera manager 122 at either a camera or a display device may include logic and/or features configured to receive information (e.g., via receive feature 512) from a host processing system. In some examples, the information may have been sent by a video manager 112 at the host processing system to a camera serving as either a surveillance camera for a surveillance system or a camera located with a display device in a display system. For these examples, the information may direct the camera to capture video content. The information may also include one or more camera commands to include a camera direction, a time period for a camera direction or panning, zooming or tilting instructions. For display system examples, the information may also include directing the camera to capture the video content contemporaneously with displaying video streamed from the host processing system at a display device (e.g., on one or more display panels).

Proceeding from block 610 to block 620 (Capture Video Content), camera manager 122 may include logic and/or features configured to capture video content (e.g., via capture feature 514). In some examples, for a surveillance system such as surveillance system 200, the video content may be captured while implementing the one or more camera commands. In other examples, for a display system such as display system 300, the video content may be captured contemporaneously with the displaying of the video stream at the display device.

Proceeding from block 620 to block 630 (Perform Video Analytics), camera manager 122 may include logic and/or features configured to perform video analytics (e.g., via analytic feature 516) on the captured video content. In some examples, camera manger 122 may generate data associated with the video analytics. For a camera in a surveillance system, the data may include a movement pattern of one or more objects in the captured video content, a lighting condition in the captured video content, color characteristics of one or more objects in the captured video or shape characteristics of one or more objects in the captured video. For a camera in a display system, the data may include a movement pattern for observers of the displayed video, information (e.g. gender and age group) for observers of the displayed video, extracted gesture information for observers of the displayed video, shape characteristics for observers of the displayed video, biometrics information (e.g. gender and age group) for observers of the displayed video, extracted gesture information for observers of the displayed video, lighting conditions at the display system while the video was displayed or types of interactions for observers when observing the displayed video.

Proceeding from block 630 to block 640 (Send Data), camera manager 122 may include logic and/or features configured to send the data associated with the video analytics (e.g., via send feature 519). Data may also include encoded video data. In some examples, the data may be sent to video manager 112 at the host processing system.

Proceeding from block 640 to decision block 650 (Updated Information Received?), camera manager 122 may determine whether updated information has been received (e.g., via receive feature 512). In some examples, the updated information may be received from video manager 112 responsive to video manager 112 receiving the data associated with the captured video content. The updated information may include updated camera commands if the camera is serving as a surveillance camera. The updated information may alternatively include directions for a camera at a display device to continue to contemporaneously capture video content. If updated information was received, the process moves to block 610. Otherwise, the process moves to decision block 660.

Proceeding from decision block 650 to decision block 660 (Additional Video Analytics?), camera manager 122 may determine whether video analytics are needed. In some examples, camera manager 122 may be instructed to capture video content and perform video analytics for a set duration of time or between specific times of the day. For these examples, additional video analytics may be needed for additionally captured video content if the set duration has not expired or the time of day still falls between the specific times of the day. If additional video analytics are needed, the process moves to block 620. Otherwise, the process comes to an end.

Figure 7:
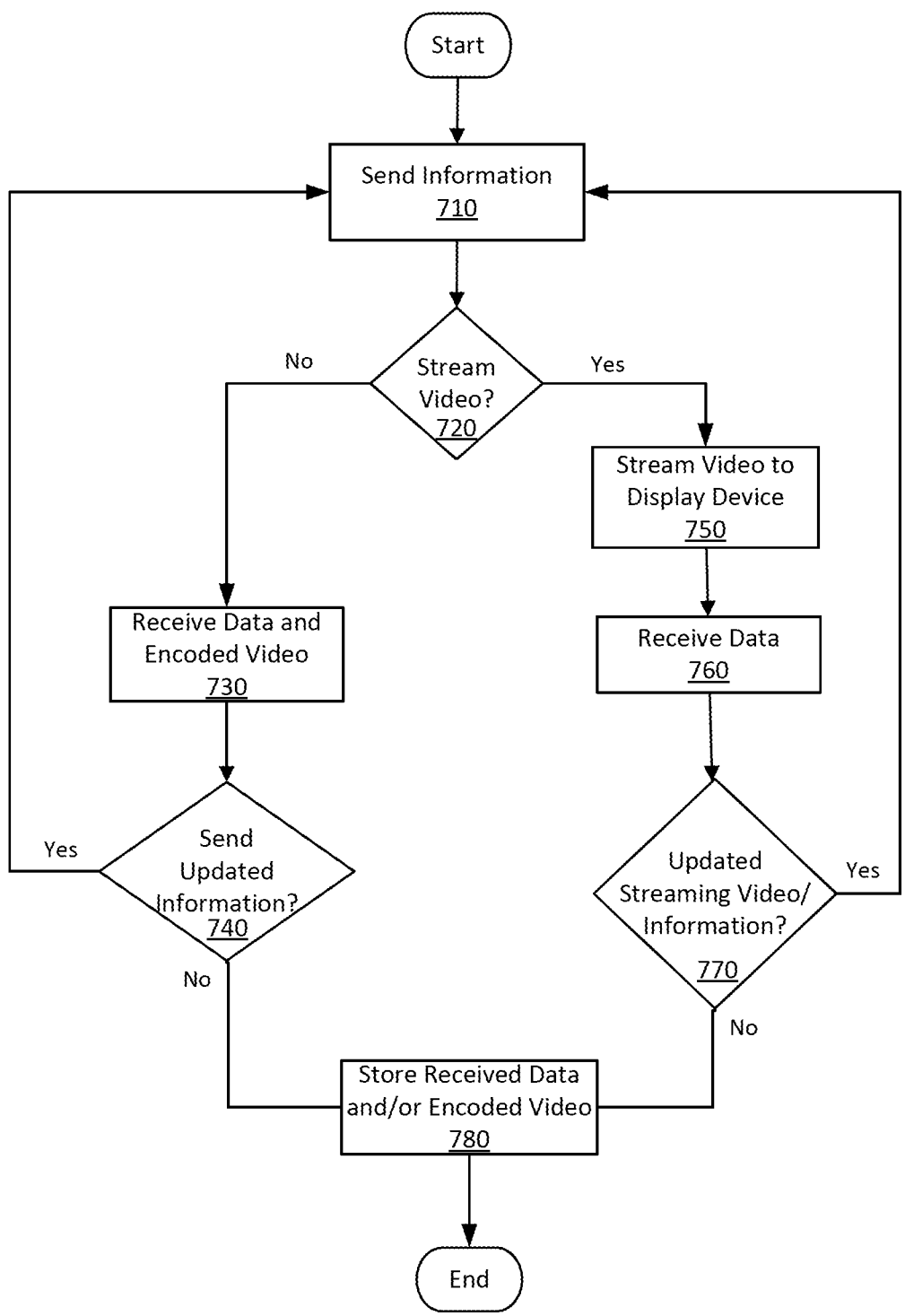
FIG. 7 illustrates an example flow diagram for receiving data associated with video analytics.

FIG. 7 illustrates an example flow diagram for receiving analytics of captured video content. In some examples, elements of systems 100, 200 or 300 as shown in FIGS. 1-3 may be used to illustrate example operations related to the flow chart depicted in FIG. 7. Video manager 112 as shown in FIGS. 1-4 may also be used to illustrate the example operations. The described example operations are not limited to implementations on systems 100, 200 or 300 or to video manager 112 as described above for FIGS. 1-4.

Moving from the start to block 710 (Send Information), video manager 112 at a host processing system may include logic and/or features configured to send information (e.g., via direct feature 412) to direct a camera to capture video content. In some examples, the information may be sent to a camera serving as either a surveillance camera for a surveillance system or a camera located with a display device in a display system. For these examples, the information in addition to directing the camera to capture video content, may also include one or more camera commands to include a camera direction, a time period for a camera direction or panning, zooming or tilting instructions. For display system examples, the information may also include directing the camera to capture the video content contemporaneously with displaying video streamed from the host processing system at a display device (e.g., on one or more display panels).

Proceeding from block 710 to decision block 720 (Stream Video?), video manager 112 may include logic and/or features configured to determine whether video is to be streamed (e.g., via stream feature 416). In some examples, video may be streamed if the camera is located with a display device in a display system. Video may not be streamed if the camera is part of a surveillance system. If the camera is part of a surveillance system the process moves to block 730. Otherwise, if the camera is located with a display device, the process moves to block 750.

Proceeding from decision block 720 to block 730 (Receive Data and Encoded Video), video manager 112 may include logic and/or features configured to receive data and encoded video (e.g., via receive feature 414). In some examples, a camera manager 122 at a surveillance camera may capture video content, perform video analytics on the capture video content and then encode the captured video content. Both data associated with the video analytics and the encoded video may be received from the surveillance camera. The data, for example, may include a movement pattern of one or more objects in the captured video content, a presence or an absence of one or more objects in a captured video content, locations of one or more objects in a captured video content, identity of one or more persons or objects in a captured video content, a lighting condition in the captured video content, color characteristics of one or more objects in the captured video or shape characteristics of one or more objects in the captured video.

Proceeding from block 730 to decision block 740 (Send Updated Information?), video manager 112 may include logic and/or features configured to determine whether updated information needs to be sent to the surveillance camera based on either the received encoded video or the data associated with the video analytics (e.g., via analysis feature 418). Video manager 112 may perform additional processing, statistical analysis, or data mining on the received encoded video or data associated with the video analytics. In some examples, video manager 112 may determine that the data associated with the video analytics indicates that new camera commands are warranted and these new commands may be included in updated information sent to the surveillance camera. If updated information is to be sent, the process moves to block 710. Otherwise, the process moves to block 780.

Returning back to decision block 720 and proceeding to block 750 (Stream Video to Display Device), video manager 112 may include logic and/or features configured to stream video to a display device located with the camera. In some examples, the video may be streamed to the display device for display on one or more display panels at the display device.

Proceeding from block 750 to block 760 (Receive Data), video manager 112 may include logic and/or features configured to receive data from the camera located with the display device (e.g., receive feature 414). In some examples, the data may be associated with video analytics for video content captured by the camera responsive to the directions previously sent. For these examples, the data may include a movement pattern for observers of the displayed video, shape characteristics for observers of the displayed video, biometrics information (e.g. gender and age group) for observers of the displayed video, extracted gesture information for observers of the displayed video, lighting conditions at the display system while the video was displayed or types of interactions for observers (e.g. gesture recognition) when observing the displayed video.

Moving from block 760 to decision block 770 (Updated Streaming Video/Information?), video manager 112 may include logic and/or features to determine whether updated streaming video and/or information is needed based on the received data associated with the video analytics (e.g., via analysis feature 418). Video manager 112 may perform additional processing, statistical analysis, or data mining on the received data associated with the video analytics. In some examples, video manager 112 may determine that the data associated with the video analytics indicates that new or updated streaming video may need to be streamed to the display device located with the camera. Also, new or updated camera commands may be warranted as well and these new commands may be included in updated information also sent to the camera. If updated streaming video/information is determined to be needed, the process moves to block 710. Otherwise, the process moves to block 780.

Moving from either decision block 740 or decision block 770 to block 780 (Store Received Data and/or Encoded Video), video manager 112 may include logic and/or features to store data received from the camera located with the display device or encoded data received from a surveillance camera (e.g., via store feature 419). In some examples, the data may include video analytics data and/or other data obtained as a result of processing video analytics data in a local or remote storage. The process may then come to an end. Alternatively, although not shown in FIG. 7, the process may continue by returning to block 710 if additional encoded video and/or data associated with video analytics is expected to be received. In some examples, block 780 may be performed as a separate process that runs concurrently with other blocks of FIG. 7 to enable real time storing of data or video.

Figure 8:
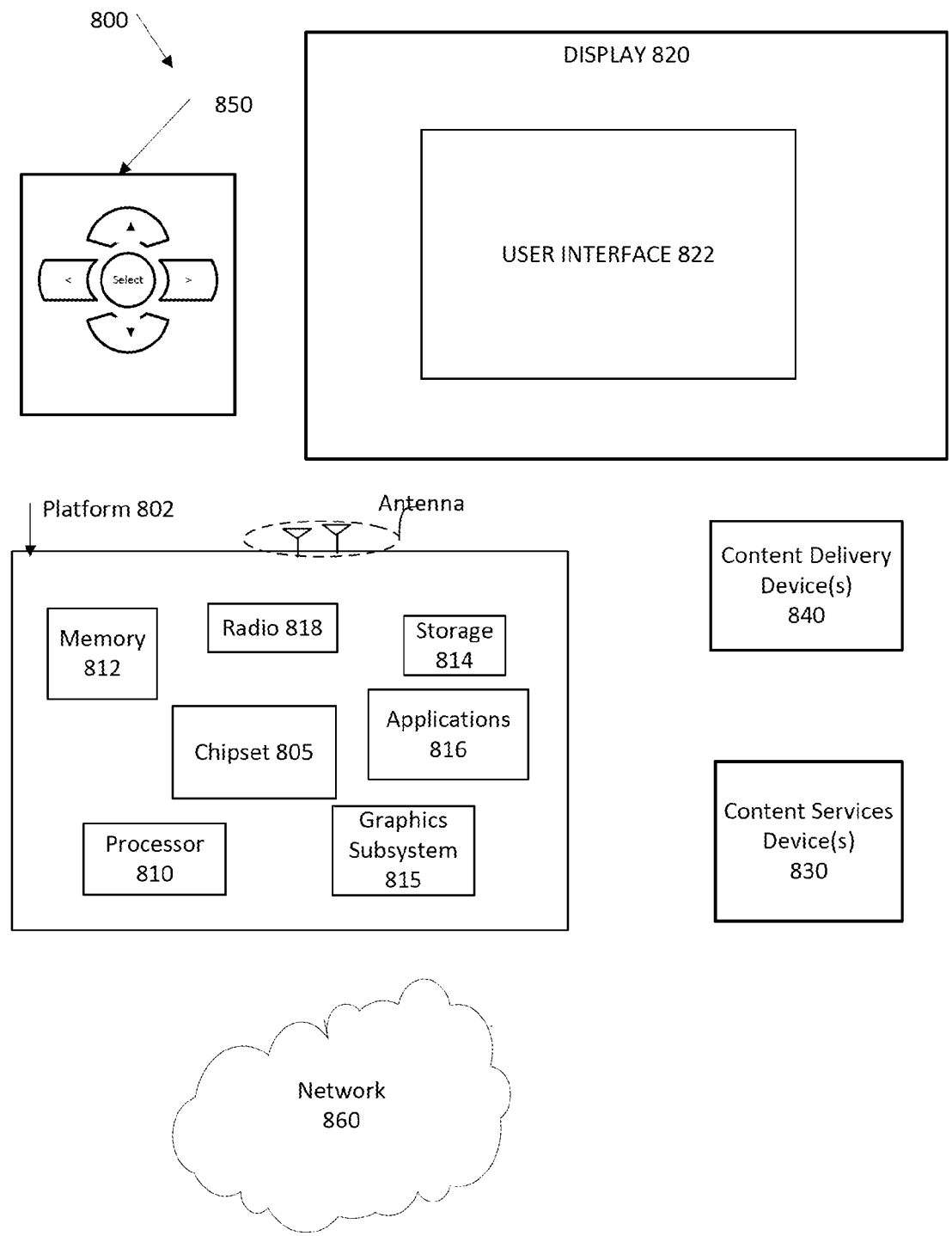
FIG. 8 illustrates an example fourth system.

FIG. 8 illustrates an example fourth system. In some examples, as shown in FIG. 8, the fourth system includes system 800. System 800 may be a system to receive, stream or analyze media although system 800 is not limited to this context. For example, system 800 may be incorporated into a host processing system a personal computer (PC), laptop computer, ultra-laptop computer, tablet computer, touch pad, portable computer, ultrabook computer, handheld computer, palmtop computer, display device, personal digital assistant (PDA), cellular telephone, combination cellular telephone/PDA, television, smart device (e.g., smart camera, smart phone, smart tablet or smart television), mobile internet device (MID), messaging device, data communication device, and so forth.

According to some examples, system 800 includes a platform 802 coupled to a display 820. Platform 802 may receive content (e.g., video, audio or images) from a content device such as content services device(s) 830 or content delivery device(s) 840 or other similar content sources. A navigation controller 850 including one or more navigation features may be used to interact with, for example, platform 802 and/or display 820. Each of these components is described in more detail below.

In some examples, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit (CPU). In some examples, processor 810 may comprise dual-core processor(s), dual-core mobile processor(s), and so forth.

Memory 812 may be implemented as a volatile memory device such as, but not limited to, a RAM, DRAM, or SRAM.

Storage 814 may be implemented as a non-volatile storage device such as, but not limited to, a magnetic disk drive, optical disk drive, solid-state disk drive, tape drive, an internal storage device, an attached storage device, flash memory, battery backed-up SDRAM (synchronous DRAM), and/or a network accessible storage device. In some examples, storage 814 may include technology to increase the storage performance enhanced protection for valuable digital media when multiple hard drives are included, for example.

Graphics subsystem 815 may perform processing of images such as still or video for display. Graphics subsystem 815 may include a processor serving as a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, a Thunderbolt™ interface, wireless HDMI, and/or wireless HD compliant techniques. For some examples, graphics subsystem 815 could be integrated into processor 810 or chipset 805. Graphics subsystem 815 could also be a stand-alone card (e.g., a discrete graphics subsystem) communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another example, the graphics and/or video functions may be implemented by a general purpose processor, including a multi-core processor. In a further example, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In some examples, display 820 may comprise any television type monitor or display. Display 820 may include, for example, a computer display screen, touch screen display, video monitor, television-like device, and/or a television. Display 820 may be digital and/or analog. For some examples, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

According to some examples, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In some examples, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 receives content such as cable television programming including media information, digital information, and/or other content. Examples of content providers may include any cable or satellite television or radio or Internet content providers. The provided examples are not meant to limit the scope of this disclosure.

In some examples, platform 802 may receive control signals from navigation controller 850 having one or more navigation features. The navigation features of controller 850 may be used to interact with user interface 822, for example. According to some examples, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In some examples, controller 850 may not be a separate component but integrated into platform 802 and/or display 820. Although this disclosure is not limited to the elements or in the context shown for controller 850.

According to some examples, drivers (not shown) may comprise technology to enable users to instantly turn on and off platform 802 like a television with the touch of a button after initial boot-up, when enabled. Program logic may allow platform 802 to stream content to media adaptors or other content services device(s) 830 or content delivery device(s) 840 when the platform is turned "off." In addition, chip set 805 may include hardware and/or software support for 5.1 surround sound audio and/or high definition 7.1 surround sound audio, for example. Drivers may include a graphics driver for integrated graphics platforms. For some examples, the graphics driver may comprise a peripheral component interconnect (PCI) Express graphics card.

In various examples, any one or more of the components shown in system 800 may be integrated or may be virtualized. For example, platform 802 and content services device(s) 830 may be integrated, or platform 802 and content delivery device(s) 840 may be integrated, or platform 802, content services device(s) 830, and content delivery device(s) 840 may be integrated, for example. In various examples, platform 802 and display 820 may be an integrated unit. Display 820 and content service device(s) 830 may be integrated, or display 820 and content delivery device(s) 840 may be integrated, for example. These examples are not meant to limit this disclosure.

In various examples, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The examples mentioned above, however, are not limited to the elements or in the context shown or described in FIG. 8.

Figure 9:
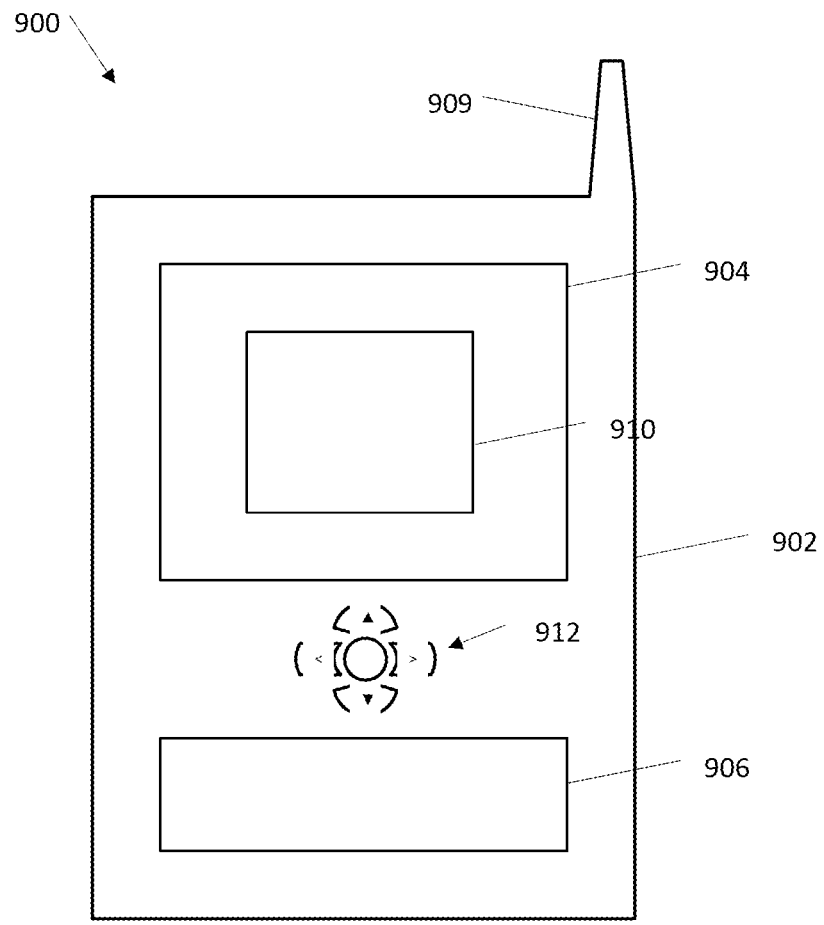
FIG. 9 illustrates an example device.

FIG. 9 illustrates an example device 900. As described above, system 800 may be embodied in varying physical styles or form factors. FIG. 9 illustrates examples of a small form factor device 900 in which system 800 may be embodied. In some examples, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultramobile computer, tablet computer, touch pad, portable computer, display device, handheld computer, palmtop computer, personal digital assistant (PDA), cellular telephone, combination cellular telephone/PDA, television, smart device (e.g., smart phone, smart tablet, smart camera or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. According to some examples, a mobile computing device may be implemented as a smart phone, smart camera or display device capable of executing computer applications, as well as voice communications and/or data communications. Although some examples may be described with a mobile computing device implemented as a smart phone, smart camera or display device by way of example, it may be appreciated that other examples may be implemented using other wireless mobile computing devices as well. The examples are not limited in this context.

As shown in FIG. 9, device 900 may include a housing 902, a display 904, an input/output (I/O) device 906, and an antenna 909. Device 900 also may include navigation features 912. Display 904 may include any suitable display unit for displaying information appropriate for use by the mobile computing device and/or for displaying information via the mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone. For some examples, a voice recognition device may digitize such information. Although the disclosure is not limited in this context.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, first methods may include receiving, at a camera, information from a host processing system. Video content may then be captured based, at least in part, on the received information and video analytics may be performed on the captured video content. Data associated with the video analytics may then be sent to the host processing system.

According to some examples for the first methods, the camera may be a first surveillance camera. The information received from the host processing system may include one or more camera commands to capture the video content. The one or more camera commands may include at least one of a camera direction, a time period for a camera direction, panning between first and second camera directions, a camera zoom or a camera tilt.

In some examples for the first methods, the first surveillance camera may be arranged for encoding the captured video content and sending the encoded captured video content to the host processing system.

According to some examples for the first methods, the data associated with the video analytics may be sent via a first communication channel and the encoded captured video content may be sent via a second communication channel. The first and the second communication channels may be included in a single interconnect coupling the first surveillance camera to the host processing system.

According to some examples for the first methods, the information received from the host processing system may include one or more camera commands to select one or more video analytics to perform on a captured video, and to send data associated with the video analytics to host processing system.

In some examples for the first methods, the data associated with the video analytics may be sent via a first communication channel and the encoded captured video content may be sent via a second communication channel. The first and the second communication channels may be included in a first and a second interconnect. The first interconnect may couple the first surveillance camera to a second surveillance camera and the second interconnect may couple the second surveillance camera to the host processing system.

According to some examples for the first methods, one or more updated camera commands may be received from the host processing system based, at least in part, on the data associated with the video analytics that was sent to the host processing system.

In some examples for the first methods, the data associated with the video analytics may include one or more of a movement pattern of one or more objects in the captured video content, a presence or an absence of one or more objects in a captured video content, locations of one or more objects in a captured video content, identity of one or more persons or objects in a captured video content, a lighting condition in the captured video content, color characteristics of one or more objects in the captured video, or shape characteristics of one or more object in the captured video.

According to some examples for the first methods, the camera may be a first camera located with a first display device arranged to receive streaming video from the host processing system. The information received from the host processing system may include information directing the first camera to capture the video content contemporaneously with the first display device displaying video included in the received video stream.

In some examples for the first methods, updated information may be received from the host processing system. The updated information may include information directing the first camera to capture additional video content contemporaneously with the first display device displaying updated video included in an updated video stream. The video stream may have been updated based, at least in part, on the data associated with the video analytics.

According to some examples for the first methods, the first camera (e.g., via a camera manager 122 at a camera) may perform the video analytics on the captured video content.

In some examples for the first methods, the first display device (e.g., via a camera manager 122 at the display device) may perform the video analytics on the video content.

In some examples for the first methods, the data associated with the video analytics may be sent via a first communication channel. The streaming video may be received via a second communication channel. The first and the second communication channels may be included in a single interconnect coupling the first display device to the host processing system.

According to some examples for the first methods, the data associated with the video analytics may include at least one of a movement pattern for observers of the displayed video, shape characteristics for observers of the displayed video, lighting conditions at the display system while the video was displayed or types of interactions for observers when observing the displayed video, biometrics information (e.g. gender and age group) for observers of the displayed video, extracted gesture information for observers of the displayed video.

In some examples, second methods may be implemented at a host processing system and may include sending information to direct a camera to capture video content. The second methods may also include receiving data associated with video analytics for video content captured by the camera responsive to the sent information and sending updated information based, at least in part, on the data associated with the video analytics.

In some examples for the second methods, the host processing system may perform additional processing, statistical analysis or data mining based, at least in part, on the data associated with the video analytics. The additional processing may include at least one of viewer gesture interpretation, executing additional commands in response to a detected human gesture, communication with a remote system, and raising an alarm in response to a detected threat condition.

In some examples for the second methods, the host processing system may store video analytics data, encoded video and/or additional data obtained from processing of data associated with the video analytics in a local storage or a remote storage.

In some examples for the second methods, the camera may be a surveillance camera and the information sent to direct the first surveillance camera may include one or more camera commands to capture the video content. The one or more camera commands may include at least one of a camera direction, a time period for a camera direction, panning between first and second camera directions, a camera zoom or a camera tilt. The one or more camera commands may also include one or more camera commands to select one or more video analytics to perform on a captured video, and to send data associated with the video analytics to host processing system.

According to some examples for the second methods, the first surveillance camera may be arranged for encoding the captured video content and sending the encoded captured video content to the host processing system.

In some examples for the second methods, the data associated with the video analytics may be received via a first communication channel and the encoded captured video content may be received via a second communication channel. The first and the second communication channels may be included in a single interconnect coupling the host processing system to the surveillance camera.

According to some examples for the second methods, the data associated with the video analytics may include one or more of a movement pattern of one or more objects in the captured video content, a presence or an absence of one or more objects in a captured video content, locations of one or more objects in a captured video content, identity of one or more persons or objects in a captured video content, a lighting condition in the captured video content, color characteristics of one or more objects in the captured video, or shape characteristics of one or more object in the captured video.

In some examples, the second methods may include streaming video to a display device located with the camera. The information sent to the camera may include information directing the camera to capture the video content contemporaneously with the display device displaying video included in the streaming video. The second methods may also include streaming updated video to the display device based, at least in part, on the data associated with the video analytics.

According to some examples for the second methods, the data associated with the video analytics may be received via a first communication channel and the streaming video may be sent via a second communication channel. The first and the second communication channels may be included in a single interconnect coupling the host computing system to the display device.

In some examples, the data associated with the video analytics may include at least one of a movement pattern for observers of the displayed video, shape characteristics for observers of the displayed video, biometrics information (e.g. gender and age group) for observers of the displayed video, extracted gesture information for observers of the displayed video, lighting conditions at the display system while the video was displayed or types of interactions for observers when observing the displayed video.

According to some examples, a first apparatus or device may include a camera, a processor circuit and a memory unit. The memory unit may be communicatively coupled to the processor circuit. The memory unit may be arranged to store a camera manager operative on the processor circuit to receive information from a host processing system. The camera manager may also be operative to capture video content using the camera based, at least in part on the received information. The camera manager may also be operative to perform video analytics on the captured video content, encode the captured video content, and send both data associated with the video analytics and the encoded captured video content to a host processing system.

In some examples for the first apparatus, the information received from the host processing system may include one or more camera commands to capture the video content. The one or more camera commands may include at least one of a camera direction, a time period for a camera direction, panning between first and second camera directions, a camera zoom or a camera tilt.

In some examples for the first apparatus, the information received from the host processing system may include one or more camera commands to select one or more video analytics to perform on a captured video, and to send data associated with the video analytics to a host processing system.

According to some examples for the first apparatus, the data associated with the video analytics may include one or more of a movement pattern of one or more objects in the captured video content, the presence or absence of one or more objects in a captured video content, locations of one or more objects in a captured video content, identity of one or more persons or objects in a captured video content, a lighting condition in the captured video content, color characteristics of one or more objects in the captured video, or shape characteristics of one or more object in the captured video.

In some examples for the first apparatus, the data associated with the video analytics may be sent via a first communication channel and the encoded captured video content may be sent via a second communication channel. The first and the second communication channels included in a single interconnect coupling the camera to the host processing system.

According to some examples for the first apparatus, a digital display may be coupled to the processor circuit to present a user interface view.

According to some examples, a second apparatus or device may include a processor circuit and a memory unit communicatively coupled to the processor circuit. The memory unit may be arranged to store a video manager operative on the processor circuit to send information to direct a camera to capture video content, receive data associated with video analytics for the video content captured by the camera, and send updated information based, at least in part, on the data associated with the video analytics.

In some examples for the second apparatus, the video manager may also be operative to stream video to a display device located with the camera. The information may be sent to the camera to include information directing the camera to capture the video content contemporaneously with the display device displaying video included in the streaming video. The video manager may also be operative to stream updated video to the display device based, at least in part, on the data associated with the video analytics.

According to some examples for the second apparatus, the data associated with the video analytics may be received via a first communication channel and the video streamed to the display device via a second communication channel. The first and the second communication channels included in a single interconnect coupling the host computing system to the display device.

In some examples for the second apparatus, the data associated with the video analytics may include at least one of a movement pattern for observers of the displayed video, shape characteristics for observers of the displayed video, biometrics information (e.g. gender and age group) for observers of the displayed video, extracted gesture information for observers of the displayed video, lighting conditions at the display system while the video was displayed or types of interactions for observers when observing the displayed video.

In some examples for the second apparatus, the video manager may also be operative to perform additional processing on data associated with the video analytics. The additional processing may include at least one of statistical analysis, data mining, data or video storage, view gesture interpretation, executing additional commands in response to a detected human gesture, executing additional commands in response to received data associated with the video analytics, communication with a remote system or raising an alarm in response to a detected threat condition.

According to some examples for the second apparatus, a digital display may be coupled to the processor circuit to present a user interface view.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method comprising:
   receiving, at a camera, information from a host processing system, the information indicative of a type of video analytics to perform at the camera;
   capturing video content based, at least in part, on the received information;

performing, at the camera, the indicated type of video analytics on the captured video content;

encoding the captured video content;

sending data associated with the video analytics to the host processing system via a first communication channel; and sending the encoded captured video content to the host processing system via a second communication channel, the first and second communication channels included in a single interconnect coupling the camera to the host processing system.

2. The computer-implemented method of claim 1, the information received from the host processing system to include one or more camera commands to capture the video content, and the one or more camera commands to include at least one of a camera direction, a time period for a camera direction, panning between first and second camera directions, a camera zoom, a camera tilt, one or more types of video analytics to perform on captured video, or to send data associated with the video analytics to the host processing system.

3. The computer-implemented method of claim 2, comprising:

receiving, at the camera, one or more updated camera commands from the host processing system based, at least in part, on the data associated with the video analytics sent to the host processing system.

4. The computer-implemented method of claim 2, the data associated with the video analytics performed at the camera including one or more of a movement pattern of one or more objects in the captured video content, a lighting condition in the captured video content, presence or absence of one or more objects in the captured video content, locations of one or more objects in the captured video content, identity of one or more persons or objects in the captured video content, color characteristics of one or more objects in the captured video, or shape characteristics of one or more object in the captured video.

5. The computer-implemented method of claim 1, the camera comprising a first camera located with a first display device arranged for receiving streaming video from the host processing system, the information received from the host processing system including information directing the first camera to capture the video content contemporaneously with the first display device displaying video included in the received video stream.

6. The computer-implemented method of claim 5, comprising receiving, at the camera, updated information from the host processing system, the updated information including information directing the first camera to capture additional video content contemporaneously with the first display device displaying updated video included in an updated video stream that was updated based, at least in part, on the data associated with the video analytics.

7. The computer-implemented method of claim 5, comprising:

sending the data associated with the video analytics via a third communication channel; and receiving the streaming video via a fourth communication channel, the third and fourth communication channels included in a single interconnect coupling the first display device to the host processing system.

8. The computer-implemented method of claim 5, the data associated with the video analytics including at least one of a movement pattern for observers of the displayed video, shape characteristics for observers of the displayed video, biometrics information for observers of the displayed video, extracted gesture information for observers of the displayed video, lighting conditions at the display system while the video was displayed or types of interactions for observers when observing the displayed video.

9. A computer-implemented method comprising:

sending, at a host processing system, information to direct a camera to capture video content and to perform an indicated type of video analytics at the camera;

receiving, at the host processing system via a first communication channel, data associated with the indicated type of video analytics performed by the camera for video content captured by the camera responsive to the sent information;

receiving, at the host processing system via a second communication channel, encoded captured video content of the camera, the first and second communication channels included in a single interconnect coupling the host processing system to the camera; and sending updated information to the camera based, at least in part, on the data associated with the video analytics.

10. The computer-implemented method of claim 9, the sent information to direct the camera to include one or more camera commands to capture the video content, and the one or more camera commands to include at least one of a camera direction, a time period for a camera direction, panning between first and second camera directions, a camera zoom, a camera tilt, one or more types of video analytics to perform on captured video, or to send data associated with the video analytics performed by the camera to the host processing system.

11. The computer-implemented method of claim 10, the data associated with the video analytics performed by the camera including one or more of a movement pattern of one or more objects in the captured video content, a lighting condition in the captured video content, presence or absence of one or more objects in the captured video content, locations of one or more objects in the captured video content, identity of one or more persons or objects in the captured video content, color characteristics of one or more objects in the captured video, or shape characteristics of one or more object in the captured video.

12. The computer-implemented method of claim 9, comprising:

streaming video to a display device located with the camera, the information sent to the camera to include information directing the camera to capture the video content contemporaneously with the display device displaying video included in the streaming video; and streaming updated video to the display device based, at least in part, on the data associated with the video analytics.

13. The computer-implemented method of claim 1, comprising:

receiving, at the host processing system, the data associated with the video analytics via a third communication channel; and sending the streaming video sent via a fourth communication channel, the third and fourth communication channels included in a single interconnect coupling the host computing system to the display device.

14. The computer-implemented method of claim 12, the data associated with the video analytics performed at the camera including at least one of a movement pattern for observers of the displayed video, shape characteristics for observers of the displayed video, biometrics information for observers of the displayed video, extracted gesture information for observers of the displayed video, lighting conditions at the display system while the video was displayed or types of interactions for observers when observing the displayed video.

15. An apparatus comprising:
a camera;
a processor circuit; and
a memory unit communicatively coupled to the processor circuit, the memory unit arranged to store a camera manager operative on the processor circuit to:
receive information from a host processing system;
capture video content using the camera based, at least in part on the received information;
perform a type of video analytics indicated in the received information on the captured video content at the camera;
encode the captured video content;
send data associated with the video analytics to the host processing system via a first communication channel; and
send the encoded captured video content to the host processing system via a second communication channel, the first and the second communication channels included in a single interconnect coupling the camera to the host processing system.

16. The apparatus of claim 15, the information received from the host processing system to include one or more camera commands to capture the video content, and the one or more camera commands to include at least one of a camera direction, a time period for a camera direction, panning between first and second camera directions, or a camera zoom or a camera tilt, and the data associated with the video analytics to include one or more of a movement pattern of one or more objects in the captured video content, a lighting condition in the captured video content, presence or absence of one or more objects in the captured video content, locations of one or more objects in the captured video content, identity of one or more persons or objects in the captured video, color characteristics of one or more objects in the captured video, or shape characteristics of one or more object in the captured video.

17. The apparatus of claim 16, comprising a digital display coupled to the processor circuit to present a user interface view.

18. An apparatus for a host processing system comprising:
a processor circuit; and
a memory unit communicatively coupled to the processor circuit, the memory unit arranged to store a video manager operative on the processor circuit to:
send information to direct a camera to capture video content and to perform an indicated type of video analytics at the camera;
receive, via a first communication channel, data associated with the video analytics performed by the camera for the video content captured by the camera;
receive, via a second communication channel, encoded captured video content of the camera, the first and second communication channels included in a single interconnect coupling host processing system to the camera; and
send updated information based, at least in part, on the data associated with the video analytics.

19. The apparatus of claim 18, the video manager also operative to stream video to a display device located with the camera, the information sent to the camera to include information directing the camera to capture the video content contemporaneously with the display device displaying video included in the streaming video, and the video manager also operative to stream updated video to the display device based, at least in part, on the data associated with the video analytics.

20. The apparatus of claim 19, the data associated with the video analytics received via a third communication channel and the video streamed to the display device via a fourth communication channel, the third and fourth communication channels included in a single interconnect coupling the host computing system to the display device.

21. The apparatus of claim 18, the data associated with the video analytics to include at least one of a movement pattern for observers of the displayed video, biometrics information for observers of the displayed video, extracted gesture information for observers of the displayed video, shape characteristics for observers of the displayed video, lighting conditions at the display system while the video was displayed or types of interactions for observers when observing the displayed video.

22. The apparatus of claim 18, the video manager also operative to perform additional processing on the received data associated with the video analytics, and the additional processing to include at least one of statistical analysis, data mining, data or video storage, view gesture interpretation, executing additional commands in response to a detected human gesture, executing additional commands in response to received data associated with the video analytics, communication with a remote system or raising an alarm in response to a detected threat condition.

23. The apparatus of claim 18, comprising a digital display coupled to the processor circuit to present a user interface view.

* * * * *